(12) United States Patent
Hwang et al.

(10) Patent No.: US 8,213,123 B2
(45) Date of Patent: Jul. 3, 2012

(54) ACTUATOR LATCH SYSTEM OF HARD DISK DRIVE

(75) Inventors: Ji-Ho Hwang, Yeosu-si (KR); Byoung-gyou Choi, Suwon-si (KR); Do-wan Kim, Hwseong-si (KR)

(73) Assignee: Seagate Technology International, Grand Cayman (KY)

( * ) Notice: Subject to any disclaimer, the term of this patent is extended or adjusted under 35 U.S.C. 154(b) by 1185 days.

(21) Appl. No.: 12/025,826

(22) Filed: Feb. 5, 2008

(65) Prior Publication Data

US 2008/0192386 A1    Aug. 14, 2008

(30) Foreign Application Priority Data

Feb. 8, 2007  (KR) .................. 10-2007-0013340

(51) Int. Cl.
    *G11B 5/54*    (2006.01)
(52) U.S. Cl. .................................... 360/256.2
(58) Field of Classification Search ............ 360/256.2, 360/256.4, 256.5, 256.6, 256.3, 256, 256.1
    See application file for complete search history.

(56) References Cited

U.S. PATENT DOCUMENTS

| 5,488,436 | A | 1/1996 | Choi et al. |
| 6,535,359 | B1 | 3/2003 | Boutaghou |
| 2007/0019332 | A1 | 1/2007 | Kim et al. |
| 2008/0180853 | A1 | 7/2008 | Son et al. |
| 2008/0186632 | A1 | 8/2008 | Kim et al. |

FOREIGN PATENT DOCUMENTS

| JP | 2002-100140 | 4/2002 |
| JP | 2005-078792 | 3/2005 |
| WO | 99/10887 | 3/1999 |

*Primary Examiner* — David D Davis
(74) *Attorney, Agent, or Firm* — Volentine & Whitt, PLLC

(57) ABSTRACT

An actuator latch system of a hard disk drive (HDD) retains a rotatable swing arm of the HDD in place when a magnetic head of the HDD is parked. The actuator latch system includes a portion of the swing arm that defines a notch at an end portion of a swing arm, and a latch lever that has at least one main hook and a rebound hook, and an elastic buffering arm. The latch lever is disposed on the base member adjacent the end portion of the swing arm and is supported so as to be rotatable. The at least one main hook prevents the swing arm from initially rotating in one direction beyond a certain point, and the rebound hook prevents the swing arm from rotating beyond a certain point after the swing arm rebounds upon colliding with the at least one main hook.

19 Claims, 11 Drawing Sheets

ACTUATOR LATCH SYSTEM OF HARD DISK DRIVE

BACKGROUND OF THE INVENTION

1. Field of the Invention

The present invention relates to a hard disk drive. More particularly, the present invention relates to an actuator latch system of a hard disk drive, which locks an actuator of the hard disk drive in place when the disk of the hard disk drive is not rotating.

2. Description of the Art

Hard disk drives (HDD) are used in electronic devices such as computers to reproduce data from a disk or record data onto the disk. More specifically, in addition to such a disk, an HDD includes a magnetic (read/write) head, an actuator for moving the magnetic head over a desired location (track) of the disk, and a spindle motor for rotating the disk. The magnetic head is floated a predetermined height from the recording surface of the disk while the disk is rotated, and detects/modifies the magnetization of the recording surface of the disk to reproduce/record data from/onto the disk.

In addition, when the HDD is not in use, that is, when the disk is not rotating, the magnetic head is parked off of the recording surface of the disk. Systems for parking the magnetic head of the HDD include a contact start stop (CSS) type of parking system and a ramp type of parking system. In the CSS type of parking system, an inner circumferential portion of the disk devoid of recorded data is reserved as a parking zone, and the magnetic head is held against the parking zone of the disk when the magnetic head is parked. In the ramp type of parking system, a ramp is disposed radially outwardly of the disk, and the magnetic head is held against the ramp when the magnetic head is parked.

However, an HDD can be subjected to external shock or vibrations when the HDD is not in use. Such external shock or vibrations have the potential to move the magnetic head out of the parking zone or off of the ramp and onto the recording surface of the disk. If this were allowed to happen, the magnetic head or the recording surface of the disk could be damaged. Therefore, the actuator needs to be locked in place when the magnetic head is parked. To this end, HDDs include various kinds of actuator latch systems.

FIGS. 1A, 1B, and 1C illustrate a conventional latch system of an HDD for locking the actuator of the HDD in place when the magnetic head is parked.

Referring to FIG. 1A, the actuator 10 of the HDD includes a swing arm 12 that is rotatably supported by a pivot 11, a suspension 13 disposed on an end portion of the swing arm 12, and a slider 14 supported by the suspension 13. The head slider 14 contains the magnetic head. The suspension biases the head slider 14 and hence, the magnetic head, toward a (recording) surface of the disk during a read/write operation in which the magnetic head is recording data onto the disk or reading data from the disk.

In addition, the HDD includes a single lever inertial latch system 20 for locking the actuator 10 in place when the magnetic head is parked on ramp 15. The inertial latch system 20 includes a latch lever 21 supported so as to be freely rotatable, a latch hook 22 integral with the latch lever 21, a notch 23 in the swing arm 12 of the actuator 10, a crash stop 24 that limits the rotation of the swing arm 12 in a clockwise direction, and a latch stop 25 that limits the rotation of latch lever 21 in the clockwise direction.

As shown in FIG. 1B, when shock applied to the HDD causes the swing arm 12 of the actuator 10 and the latch lever 21 to rotate counter-clockwise due to inertia, the latch hook 22 is received in the notch 23 such that the rotation of the swing arm 12 of the actuator 10 is arrested. On the other hand, as shown in FIG. 1C, when shock applied to the HDD causes the swing arm 12 of the actuator 10 and the latch lever 21 to rotate clockwise due to inertia, the swing arm 12 collides with the crash stop 24, and then rebounds from the crash stop 24 and thus rotates counter-clockwise. At the same time, the latch lever 21 rebounds from the latch stop 25 and thus rotates counter-clockwise. In this case, the latch hook 22 can be received in the notch 23 to arrest the further rotation of the actuator 10 in the counter-clockwise direction. However, the conventional single lever inertial latch system 20 is unreliable.

In the case in which the shock applied to the HDD causes the swing arm 12 to initially rotate counter-clockwise, the rotation of the swing arm 12 is indeed arrested by the latch lever 21 as described above. However, the impulse generated by the engagement between the swing arm 12 and the latch hook 22 causes the latch lever 21 and the swing arm 12 to spring back. Thus, the swing arm 12 rotates clockwise. The swing arm 12 collides with the crash stop 24, rebounds, and then again rotates counter-clockwise. In this case, though, the rotation of the swing arm 12 and the rotation of the latch lever 21 are poorly timed. As a result, the swing arm 12 is not hooked by the latch hook 22. Therefore, the swing arm 12 continues to rotate counter-clockwise such that the magnetic head moves off of the ramp 15 and onto the recording surface of the disk. Accordingly, the magnetic head or the recording surface of the disk can be damaged.

FIGS. 2A, 2B, and 2C show a dual-lever inertial latch system 40 that is designed to obviate the above-described problem of the single lever inertial latch system.

Referring to FIG. 2A, the dual-lever inertial latch system 40 includes first and second latch levers 41 and 42 that are supported so as to be freely rotatable, a latch pin 43 integral with the first latch lever 41, a latch hook 44 integral with the second latch lever 42, a notch 45 in a swing arm 32 of the actuator 30, and a crash stop 46 limiting the rotation of the swing arm 32 in the clockwise direction.

As shown in FIG. 2B, when shock applied to the HDD causes the swing arm 32 of the actuator 30 and the first and second latch levers 41 and 42 to rotate counter-clockwise due to inertia, the latch hook 44 is received in the notch 45 in the swing arm 32. Thus, the swing arm 32 of the actuator 30 cannot rotate further. On the other hand, as shown in FIG. 2C, when shock applied to the HDD causes the swing arm 32 of the actuator 30 and the first latch lever 41 to rotate clockwise due to inertia, the swing arm 32 initially rotates clockwise, then collides with the crash stop 46, rebounds from the crash stop 46, and thus rotates counter-clockwise. In addition, the first latch lever 41 rotates clockwise, and the latch pin 43 engages the second latch lever 42 to make the second latch lever 42 rotate in the counter-clockwise direction. Accordingly, the latch hook 44 of the second latch lever 42 is received in the notch 45 and thus, the rotation of the swing arm 32 in the counter-clockwise direction is arrested.

The conventional dual-lever inertial latch system 40 operates reliably regardless of the direction in which shock is applied to the HDD. However, two latch levers 41 and 42 are required. That is, the structure of the dual lever latch system 40 is complex and bulky. Accordingly, the dual-lever inertial latch system 40 is expensive. Also, it is difficult to incorporate the dual-lever inertial latch system into a small disk drive such as those used in mobile devices.

SUMMARY OF THE INVENTION

An object of the present invention is to provide a more reliable actuator latch system in a hard disk drive (HDD).

According to an aspect of the present invention, there is provided in a hard disk drive (HDD) having a base, a swing arm supported on the base so as to be rotatable about an axis of rotation, and a magnetic head supported by the swing arm, an actuator latch system including an integral part of the swing arm that delimits a notch at a rear end portion of the swing arm, and a latch lever having at least one main hook and a rebound hook, and a counterbalance. The latch lever is disposed adjacent the rear end portion of the swing arm when the swing arm is in a position at which the magnetic head is parked, and is mounted to the base so as to be rotatable. Each of the hooks of the latch lever and the notch face in opposite directions. The part of the swing arm that delimits the notch is disposed between the hooks at one end of the latch lever and the counterbalance when the magnetic head is parked. A main hook and the rebound hook selectively engage the swing arm within the notch, during an initial rotation of the swing arm and after the swing rebounds from the latch lever, to arrest the rotation of the swing arm when the magnetic head is parked.

The rebound hook is offset with respect to each main hook in a direction of rotation of the swing arm. Also, the rebound hook is disposed closer to the axis of rotation of the swing arm than each main hook. The latch lever may also include a latch bumper protruding toward a side wall of the base member to prevent the latch lever from rotating beyond a certain point after it rebounds from the swing arm. The latch bumper also minimizes the time it take for the rebound hook to return to a point at which it will hook the swing arm.

Preferably, the hooks of the latch lever and the counterbalance are disposed on opposite sides of the axis of rotation of the latch lever. The counterbalance may have an elastic buffering arm that faces in a direction towards the rear end portion of the swing arm. Also, the latch system may include a stopper positioned on the base within the path of the counterbalance when the latch lever is rotating in one direction about its axis of rotation to arrest the rotation.

According to another aspect of the present invention, there is provided a hard disk drive comprising a base, a spindle motor mounted to the base, a disk mounted to the spindle motor so as to be rotated by the spindle motor, a swing arm supported on the base so as to be rotatable about an axis of rotation, a magnetic head supported by the swing arm, a voice coil motor (VCM) that rotates the swing arm, and a latch lever having a at least one main hook and a rebound hook, and a counterbalance. The latch lever is disposed adjacent a rear end portion of the swing arm when the magnetic head is parked. The swing arm defines a notch at the rear end portion thereof. The latch lever is mounted to the base so as to be rotatable about an axis of rotation. Each of the hooks of the latch lever and the notch face in opposite directions. The part of the swing arm that delimits the notch is disposed between the hooks at one end of the latch lever and the counterbalance when the magnetic head is parked. A main hook and the rebound hook selectively engage the swing arm within the notch, during an initial rotation of the swing arm and after the swing rebounds from the latch lever, to arrest the rotation of the swing arm when the magnetic head is parked.

BRIEF DESCRIPTION OF THE DRAWINGS

The above and other objects features and advantages of the present invention will become more apparent from the following detailed description of the preferred embodiments thereof made with reference to the attached drawings in which.

DETAILED DESCRIPTION OF THE PREFERRED EMBODIMENTS

A hard disk drive (HDD) having an actuator latch system according to the present invention will be described in detail hereinafter with reference to FIGS. 3-9.

Figure 1A:
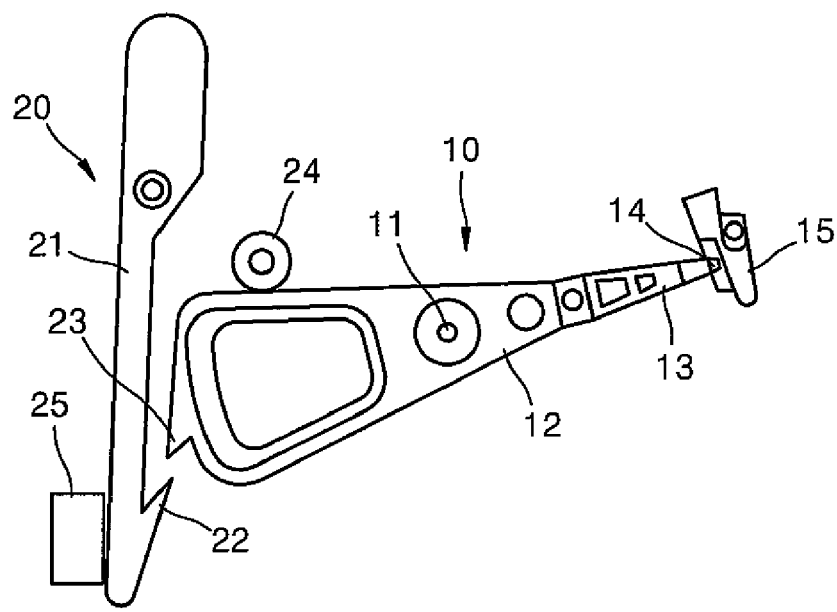
FIGS. 1A, 1B, and 1C are each a plan of a conventional single lever inertial latch system of a hard disk drive (HDD), and together illustrate the operation of the latch system.
Figure 1B:
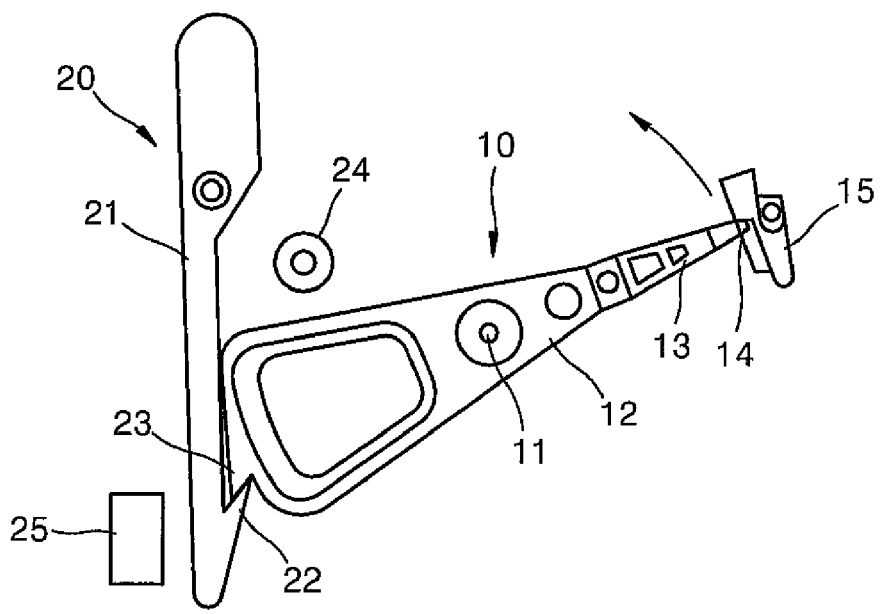
Figure 1C:
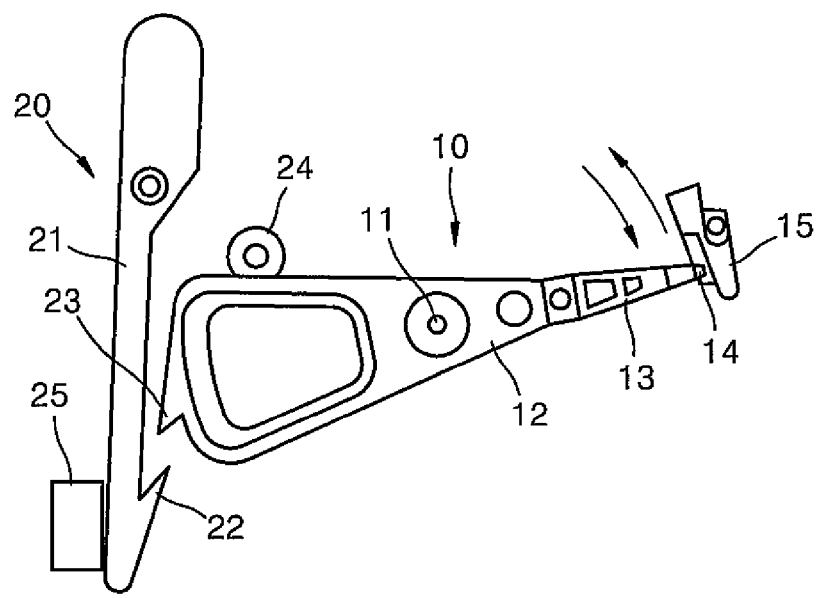
Figure 2A:
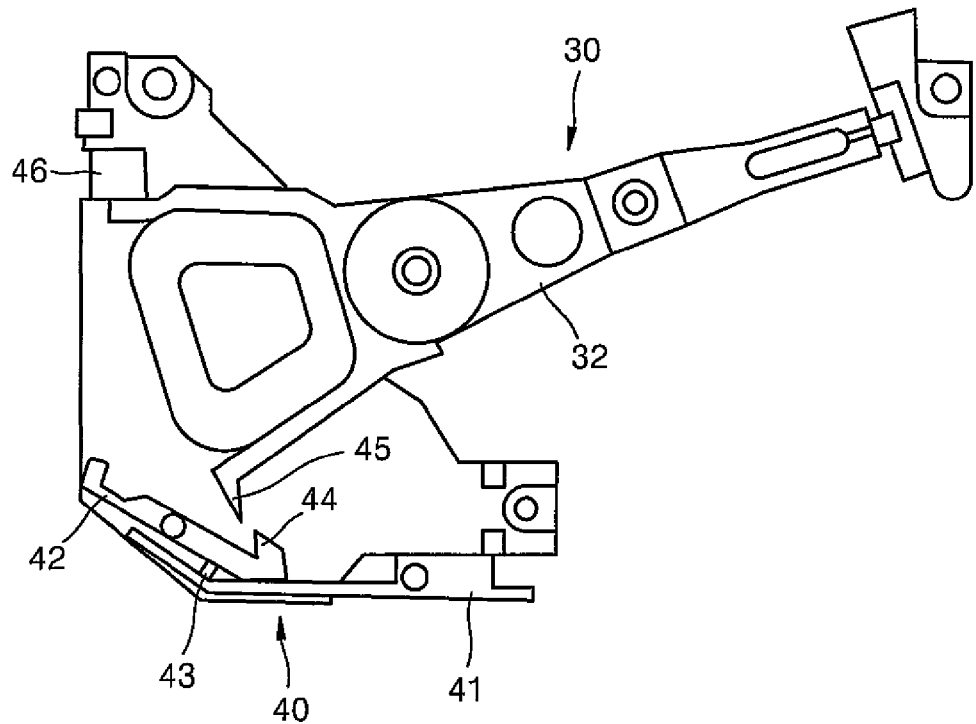
FIGS. 2A, 2B, and 2C are each a plan view of a conventional dual-lever inertial latch system of an HDD, and together illustrate the operation of the latch system.
Figure 2B:
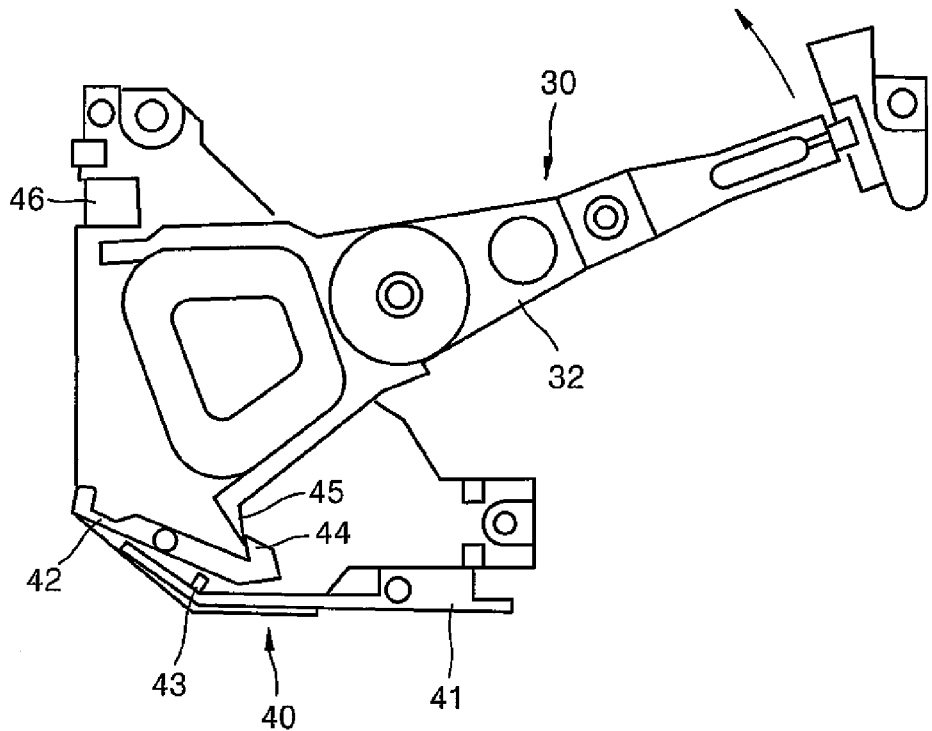
Figure 2C:
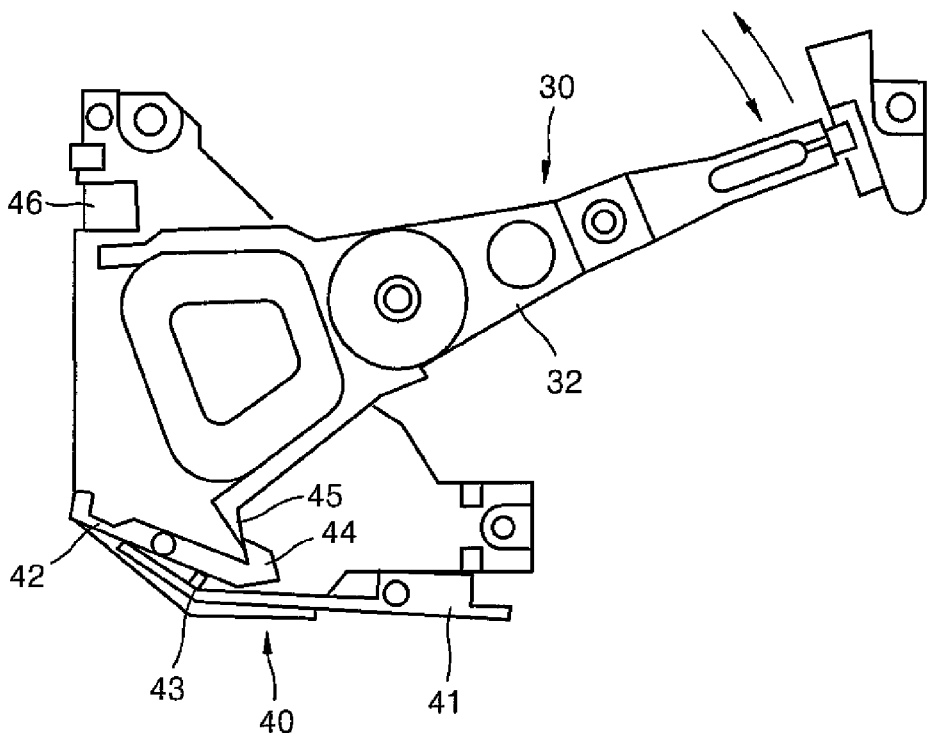
Figure 3:
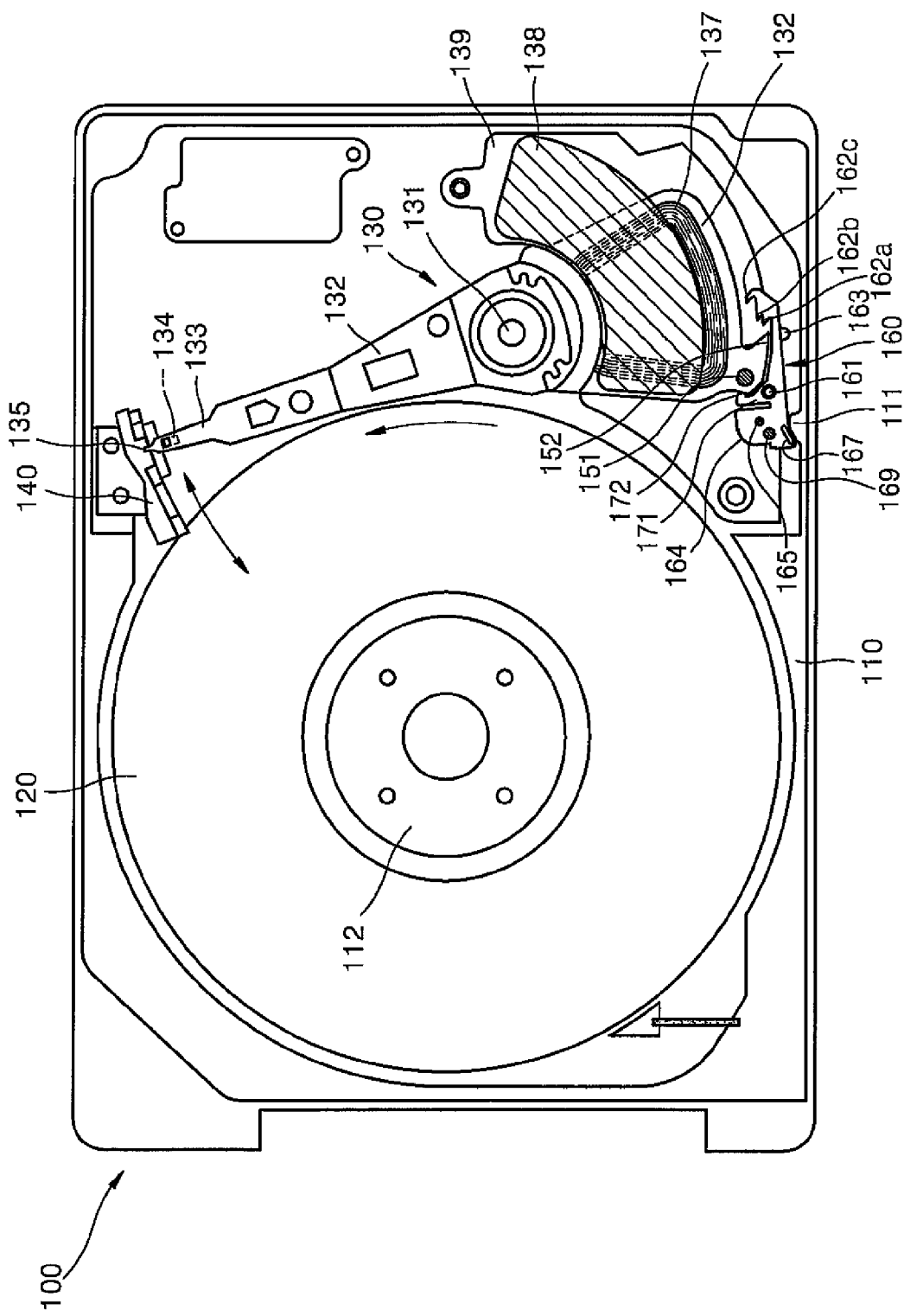
FIG. 3 is a plan view of an HDD including an actuator latch system according to the present invention.
Figure 4:
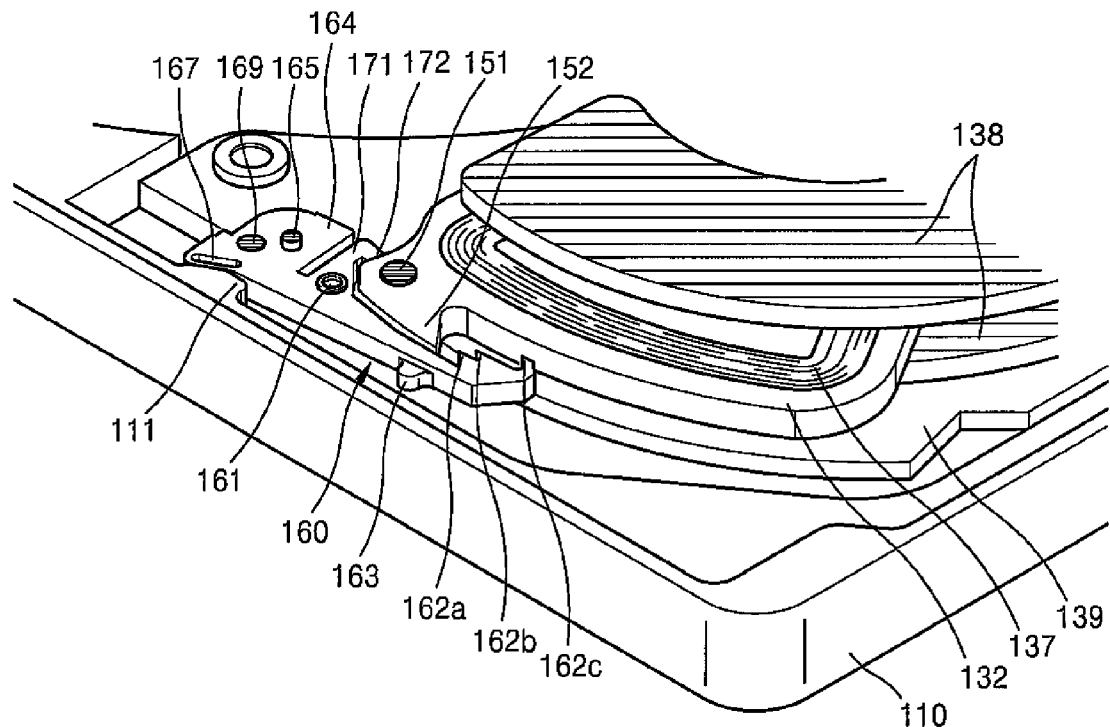
FIG. 4 is a perspective view of the actuator latch system of the HDD shown in FIG. 3.
Figure 5:
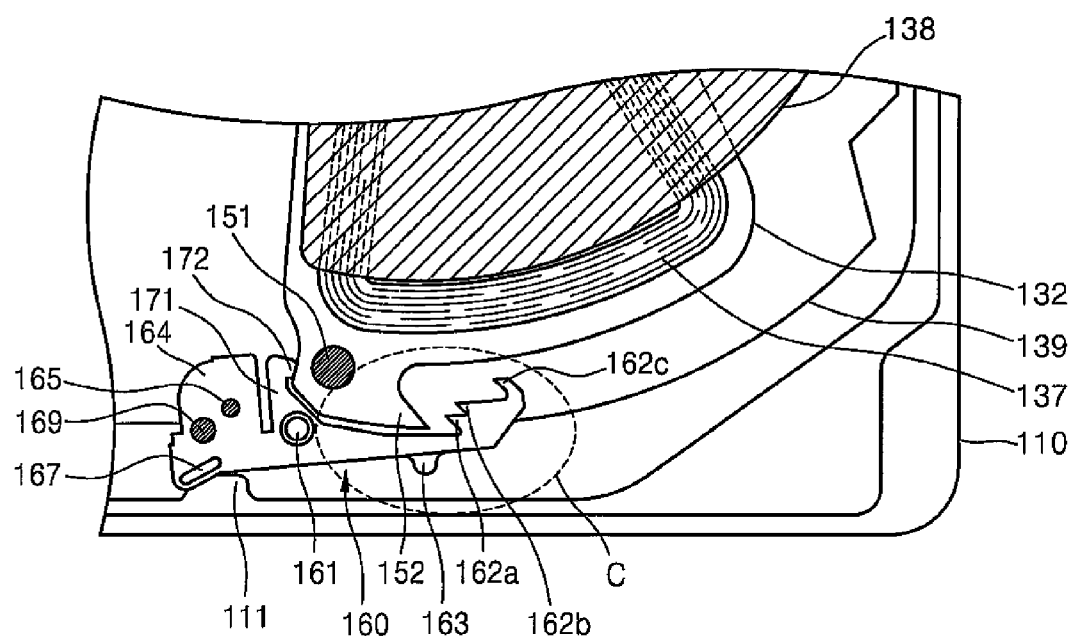
FIG. 5 is a plan view of the actuator latch system according to the present invention.

Referring first to FIGS. 3 through 5, the HDD 100 includes a base 110, a spindle motor 112 mounted to the base 110, a disk 120 mounted to the spindle motor 112 so as to be rotated by the spindle motor 112, a magnetic head, and an actuator 130 that moves the magnetic head over the disk 120 to facilitate the recording/reproducing data onto/from the disk 120. The actuator 130 includes a pivot 131 disposed on the base 110, a swing arm 132 supported by the pivot 131 so as to be rotatable, a head slider 134 that contains the magnetic head, a suspension assembly 133 disposed on a front end portion of the swing arm 132 and which supports the head slider 134, and a voice coil motor (VCM) that rotates the swing arm 132 about the central longitudinal axis of the pivot 131. The elasticity of the suspension assembly 133 biases the magnetic head towards a surface of the disk 120 during a read/write operation in which data is being recorded onto or read from the surface of the disk.

The VCM includes a VCM coil 137 disposed on a rear end portion of the swing arm 132, and a magnet or magnets 138 disposed above and/or below the VCM coil 137 so as to face the VCM coil 137. The magnet(s) 138 is/are attached to a yoke 139 that is, in turn, fixed to the base 110. The VCM is controlled by a servo control system that controls the supply of current to the VCM coil 137, and rotates the swing arm 132 in a direction according to Fleming's left-hand rule due to an interaction between the electric current flowing through the VCM coil 137 and the magnetic field formed by the magnets 138. In particular, when the HDD 100 is turned on and the disk 120 starts rotating, the VCM rotates the swing arm 132 counter-clockwise to move the magnetic head onto a recording surface of the disk 120. On the other hand, when the HDD 100 is turned off and the disk 120 stops rotating, the VCM rotates the swing arm 132 clockwise so that the magnetic head is moved off of the recording surface of the disk 120 and is parked. More specifically, when the disk 120 stops rotating, the swing arm 132 is rotated clockwise by the VCM, and an end-tab 135 of the suspension assembly 133 is slid up and onto the ramp 140 where it remains to thereby park the magnetic head.

The HDD 100 also includes an actuator latch system. The actuator latch system retains the actuator 130 when the magnetic head 140 is parked. That is, the actuator latch system prevents external shock or vibrations from rotating the swing arm 132 when the HDD 100 is not in use, i.e., when the magnetic head is parked. In particular, the actuator latch system prevents the magnetic head from being moved into contact with the recording surface of the disk 120 which situation could otherwise result in the recording surface and/or the magnetic head being damaged.

The actuator latch system includes a member defining a notch 152 at a rear end portion of the swing arm 132, and a latch lever 160 rotatably supported on the base 110 by a pivot 161. The rear end portion of the swing arm 132 is generally formed of an injection-molded plastic such that the member defining the notch 152 is easily formed unitarily with the swing arm 132 during the injection molding process. The latch lever 160 has main hooks 162*a* and 162*b* and a rebound hook 162*c* disposed at one end thereof, and a counterbalance 164 at the other end thereof. In addition, the latch lever 160 can include a latch bumper 163.

The rotation of the swing arm 132 in the clockwise direction due to inertia, when a shock is applied to the HDD while the magnetic head is parked, is restricted by the counterbalance 164. More specifically, the counterbalance 164 collides with a side of the rear end of the swing arm 132 as the swing arm rotates clockwise to prevent the swing arm 132 from rotating further in the clockwise direction. The counterbalance 164 may include a buffering arm 171 for buffering the shock generated when the counterbalance 164 and the swing arm 132 collide. To this end, the buffering arm 171 is preferably formed of an elastic material, for example, a plastic material. Also, the buffering arm 171 may have a protrusion 172 that projects toward the side of the rear end of the swing arm 132. The protrusion 172 reduces the area of contact between the buffering arm 171 and the swing arm 132 in order to minimize the amount of particles that are produced when the buffering arm 171 and the swing arm 132 collide.

The latch system may also have a stopper 111 positioned on the base 110 to block the counterbalance 164. More specifically, the stopper 111 collides with the counterbalance 164 of the latch lever 160 when the latch lever 160 rotates counter-clockwise due to inertia. Thus, the stopper 111 limits the rotation of the latch lever 160 in the counter-clockwise direction. In addition, the counterbalance 164 may have a hole 167 extending therein in the direction of the thickness of the latch lever 160. The hole 167 helps the counterbalance 164 absorb shock when the counterbalance 164 collides with the stopper 111 and thus, prevents the latch lever 160 from being damaged and helps to minimize noise.

Furthermore, the latch system may also have a first core 151 and a second core 165 disposed, respectively, in the swing arm 132 and the latch lever 160. The first core 151 is disposed in a corner of the rear end portion of the swing arm 132. The first core 151 may be a magnetic body, for example, a steel body, so that a magnetic force of attraction is generated between the first core 151 and the magnet(s) 138. Therefore, the first core 151 applies torque to the swing arm 132 in the clockwise direction. The torque prevents the actuator 130 from being moved by weak shocks and vibrations.

The second core 165 may be also formed of a magnetic body, for example, a steel body, so that a magnetic force of attraction is generated between the second core 165 and the magnet(s) 138. Therefore, the second core 165 applies a torque to the latch lever 160 in the clockwise direction. Therefore, the locked state of the actuator 130 can be maintained. Preferably, the size of the first core 151 is larger than that of the second core 165 so that the torque applied to the swing arm 132 is greater than that applied to the latch lever 160.

The latch system may also include a weight 169 installed on the latch lever 160. Preferably, the weight 169 is installed on the counterbalance 164 of the latch lever 160. Thus, the inertia of the latch lever 160 can be set by providing a weight 169 of a given mass.

Figure 6A:
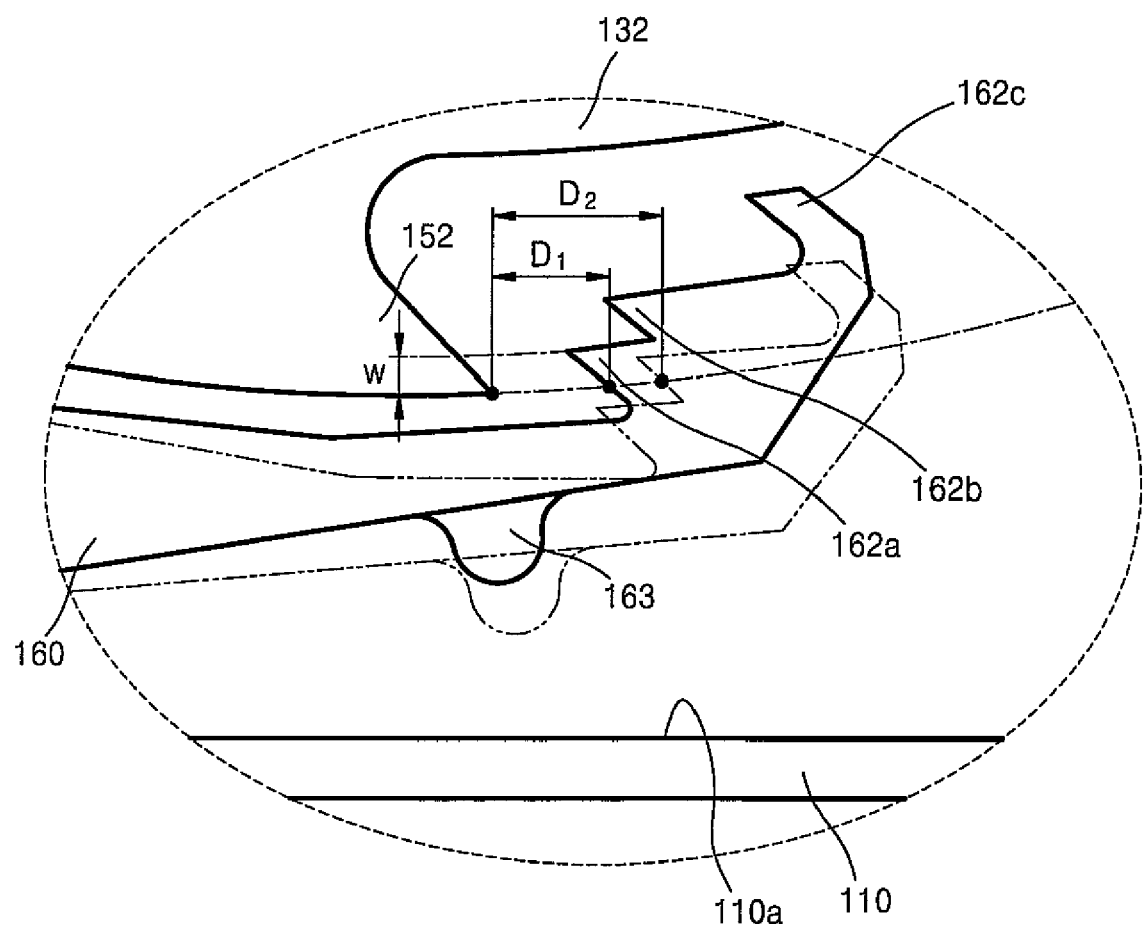
FIGS. 6A and 6B are each an enlarged view of portion C of FIG. 5 and illustrate in detail features of the latch system according to the present invention.
Figure 6B:
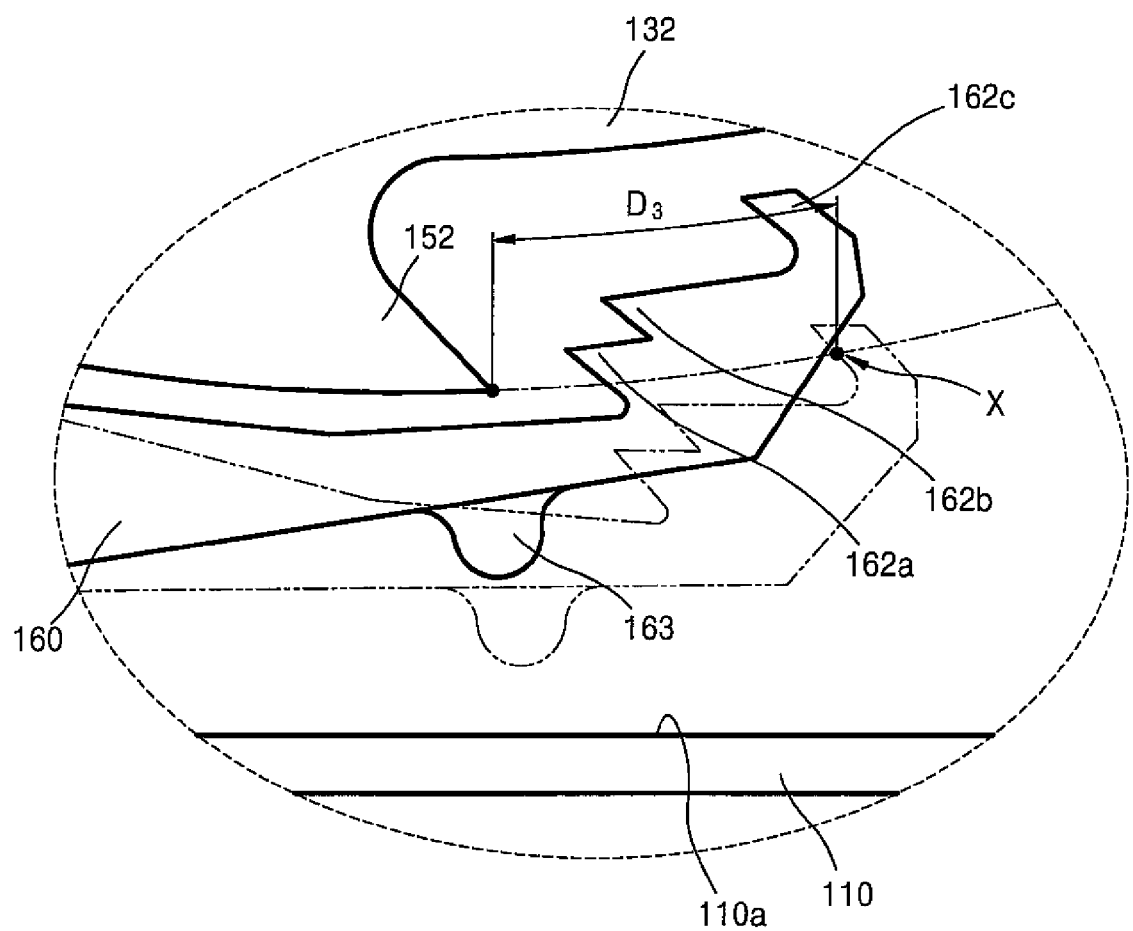

The main hooks 162*a* and 162*b*, the rebound hook 162*c*, and the latch bumper 163 will now be described in more detail with reference to FIGS. 6A and 6B.

The main hooks 162*a* and 162*b* limit an initial rotation of the swing arm 132 in the counter-clockwise direction due to inertia, when a shock is applied to the HDD while the magnetic head is parked. The first main hook 162*a* is located close to the notch 152 of the swing arm 132 to minimize the impulse created when the swing arm 132 of the actuator 130 and the first main hook 162*a* collide. That is, the distance D1 is designed for in consideration of the impulse which occurs when the actuator 130 and the first main hook 162*a* collide. In particular, the first distance D1 between the first main hook 162*a* and an edge of the swing arm 132 delimiting the notch 152 is relatively short so that the first main hook 162*a* and the swing arm 132 of the actuator 130 contact each other within a short time period after the swing arm 132 begins to rotate due to a shock applied to the HDD while the magnetic head is parked. Accordingly, the force transferred to the latch lever 160 at the notch 152 of the swing arm 132 is minimized. Thus, the rebounding of the swing arm 132 and the latch lever 160 are also minimized. Even if the swing arm 132 and the latch lever 160 rebound upon colliding with one another, the kinetic energy at this time is relatively small. Therefore, the rebounding of the swing arm 132 and the buffering arm 171 of the latch lever 160 is minimal.

Meanwhile, the swing arm 132 might not be hooked by the first main hook 162*a* for various reasons. In this case, the second main hook 162*b* engages the swing arm 132 within the notch 152 to prevent the swing arm 132 from rotating further. To this end, the second main hook 162*b* is located closer to the pivot 131 of the swing arm 132 than the first main hook 162*a*. That is, the distance between the second main hook 162*b* and the pivot 131 of the swing arm 132 is shorter than the distance between the first main hook 162*a* and the pivot 131 of the swing arm 132 in a state in which the magnetic head is parked. In addition, the second main hook 162*b* is located further away from the notch 152 than the first main hook 162*a*. More specifically, the distance D1 between the first main hook 162*a* and an edge of the swing arm 132 delimiting the notch 152 is less than the distance D2 between the second main hook 162*b* and the edge of the swing arm 132 delimiting the notch 152.

In addition, the width W of the first main hook 162*a* received within the notch 152 is relatively small to ensure that the swing arm 132 is not engaged by the first main hook 162*a* when the swing arm 132 is rotated counter-clockwise to begin a read/write operation. Such an operation will be described later on in more detail with reference to FIG. 9.

The rebound hook 162*c* prevents the swing arm 132 from secondarily rotating in the counter-clockwise direction. Preferably, the rebound hook 162*c* is located at the front edge of the latch lever 160. The rebound hook 162*c* is located further from the notch 152 of the swing arm 132 than the main hooks 162*a* and 162*b* are. That is, the rebound hook is offset with respect to the main hooks 162*a* and 162*b* in the direction of rotation of the swing arm 132. This is illustrated in FIG. 6A wherein the distance D3 between the rebound hook 162c and the notch 152 is greater than the first and second distances D1 and D2. In addition, the rebound hook 162c is disposed closer to the pivot 131 of the swing arm 132 than the main hooks 162a and 162b, in a state in which the magnetic head is parked. Therefore, the rebound hook 162c is located along the path of movement of the swing arm 132 even when the main hooks 162a and 162b are out of such a path, as shown by the dashed lines in FIG. 6B.

More specifically, the swing arm 132 and the latch lever 160 rebound when the swing arm 132 rotating in the counter-clockwise direction collides with one of the main hooks 162a and 162b of the latch lever 160. As a result, the swing arm 132 and the latch lever 160 both rotate clockwise. The swing arm 132 then collides with the buffering arm 171 of the latch lever 160 and is thus secondarily rotated counter-clockwise, whereas the latch lever 160 collides with a side wall 110a of the base 110 and is thus rotated counter-clockwise. The swing arm 132 is hooked by the rebound hook 162c of the latch lever 160 if the rebound hook 162c reaches point X earlier than the edge of the swing arm 132 which defines the notch 152. Point X is a point along the path of movement of the edge of the swing arm 132 which defines the notch 152.

The latch bumper 163 protrudes from the latch lever 160 toward the side wall 110a of the base 110, and limits the range of rotation of the latch lever 160 in the clockwise direction. Therefore, the time it takes for the rebound hook 162c of the latch lever 160 to reach point X is minimized by the latch bumper 163 to ensure that the rebound hook 162c arrives at point X before the edge of the swing arm 132 that defines the notch 152. Also, the distance D3 between the rebound hook 162c and the notch 152 is also designed to ensure that the rebound hook 162c arrives at point X before the edge of the swing arm 132 that defines the notch 152.

The operation of the actuator latch system according to the present invention will be described in more detail with reference to FIGS. 7-9.

Figure 7:
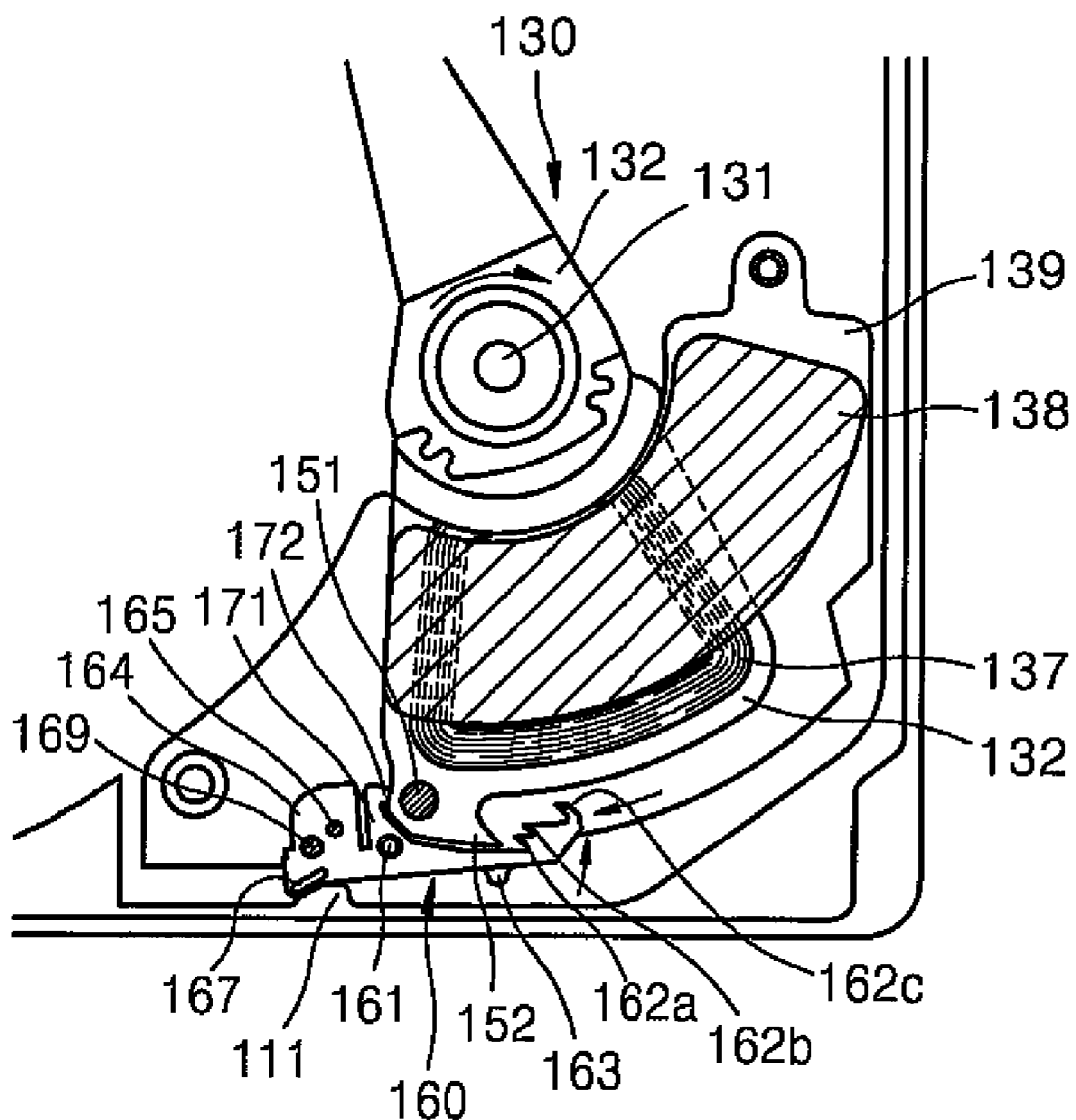
FIG. 7 is a plan view of the actuator latch system according to the present invention and illustrates the locking of an actuator of the HDD with a main hook of the latch system.

Referring first to FIG. 7, the HDD 100 stops operating, and the swing arm 132 is rotated by the VCM clockwise about the axis of the pivot 131 to park the magnetic head on the ramp 140 (refer to FIG. 3). At this time, the side of the rear end of the swing arm 132 contacts the protrusion 172 projecting from the buffering arm 171 of the latch lever 160, and thereby rotates the latch lever 160 counter-clockwise about the axis of the pivot 161. Then the counterbalance 164 of the latch lever 160 contacts the stopper 111 such that the rotation of the latch lever 160 in the counter-clockwise direction is arrested.

The VCM is turned off when the magnetic head is parked on the ramp 140. At this time, the swing arm 132 is maintained in position by the torque applied to the swing arm 132 in the clockwise direction by the first core 151 and the magnet(s) 138. In addition, as described above, the torque that is applied to the swing arm 132 is larger than that applied to the latch lever 160 by the second core 161 and the magnet(s) 38. Therefore, the swing arm 132 remains stably locked in position.

Meanwhile, the swing arm 132 can be rotated counter-clockwise due to inertia in the state in which the magnetic head is parked, when a shock applied to the HDD 100 generates torque that is greater than the torque applied to the swing arm 132 by the first core 151 and the magnet 138. In this case, the swing arm 132 is hooked by the first main hook 162a or the second main hook 162b of the latch lever 160. Thus, further rotation of the swing arm 132 in the counter-clockwise direction is prevented.

On the other hand, the shock applied to the HDD 100 can generate torque that acts on the swing arm 132 and the latch lever 160 in the clockwise direction. In this case, though, the swing arm 132 and the latch lever 160 do not rotate in the clockwise direction because the side of the rear end of the swing arm 132 is in contact with the buffering arm 171 of the latch lever 160, and the buffering arm 171 of the latch lever 160 absorbs the shock to some degree. In addition, the swing arm 132 may rebound from the buffering arm 171 so as to rotate counter-clockwise. However, in this case, the swing arm 132 is hooked by the first or second main hook 162a or 162b of the latch lever 160 such that the swing arm 132 is prevented from rotating further in the counter-clockwise.

The engagement of the swing arm 132 by the rebound hook 162c of the actuator latch system according to the present invention will now be described with respect to FIGS. 8A through 8D.

Figure 8A:
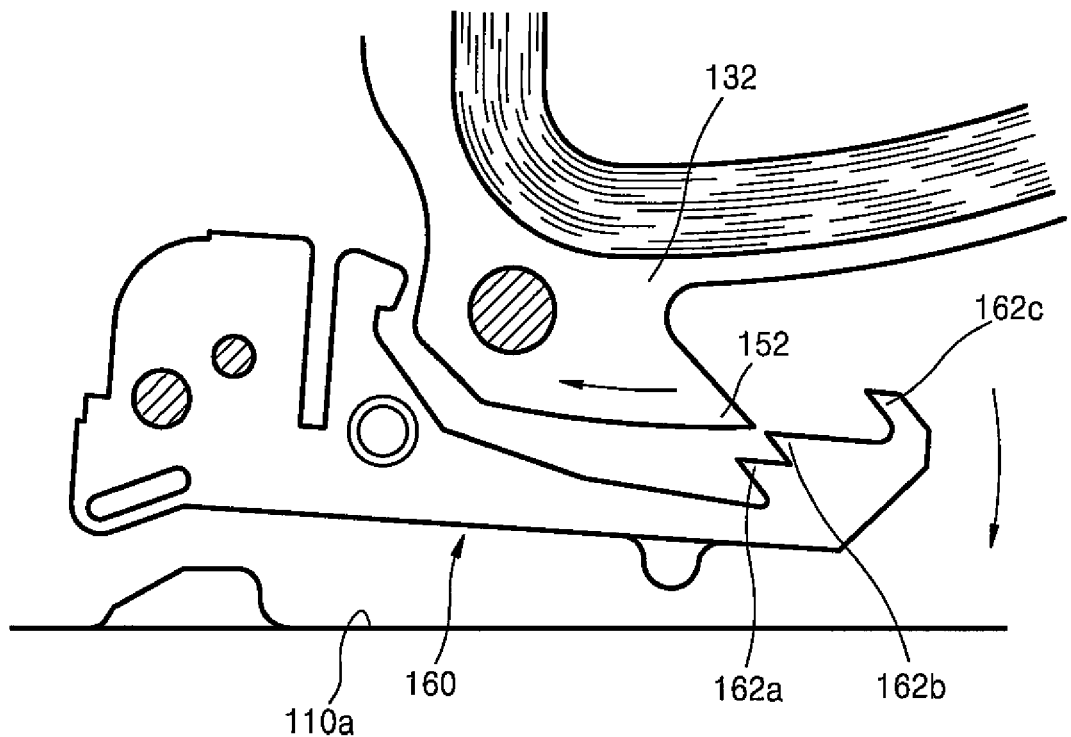
FIGS. 8A through 8D are each a plan view of the actuator latch system according to the present invention and illustrate the locking of the actuator of the HDD with a rebound hook of the latch system.

Referring to FIG. 8A, the swing arm 132 rotating in the counter-clockwise direction due to an external shock applied to the HDD collides with one of the main hooks 162a and 162b of the latch lever 160. If the external shock is large enough, the swing arm 132 and the latch lever 160 rebound and thus, rotate in clockwise directions.

Figure 8B:
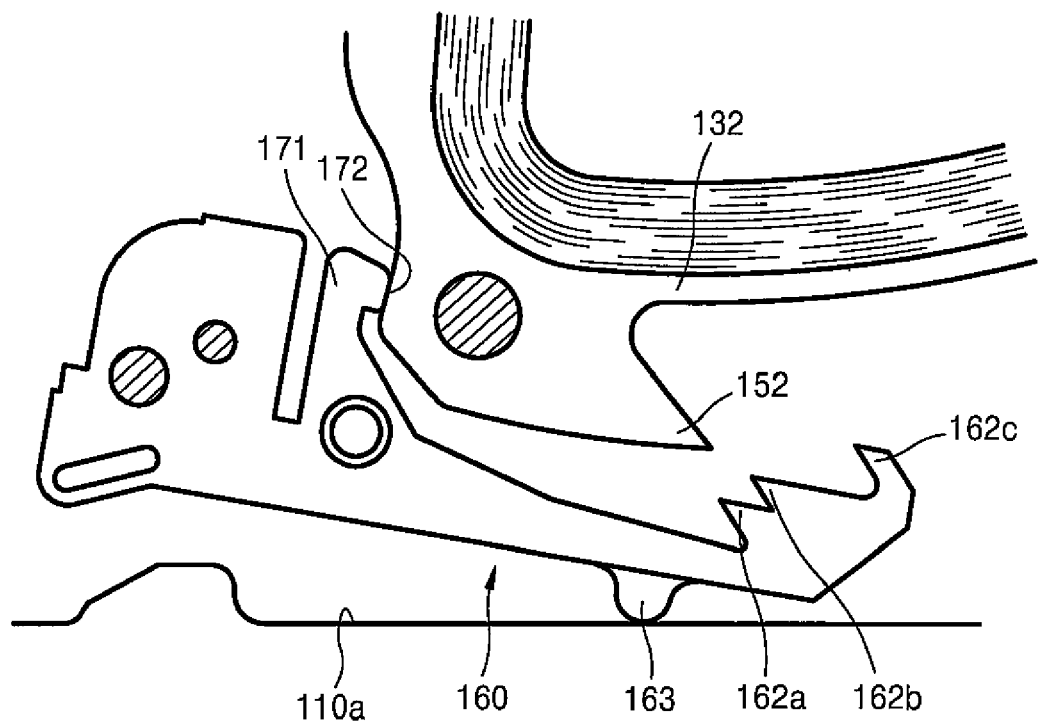
Figure 8C:
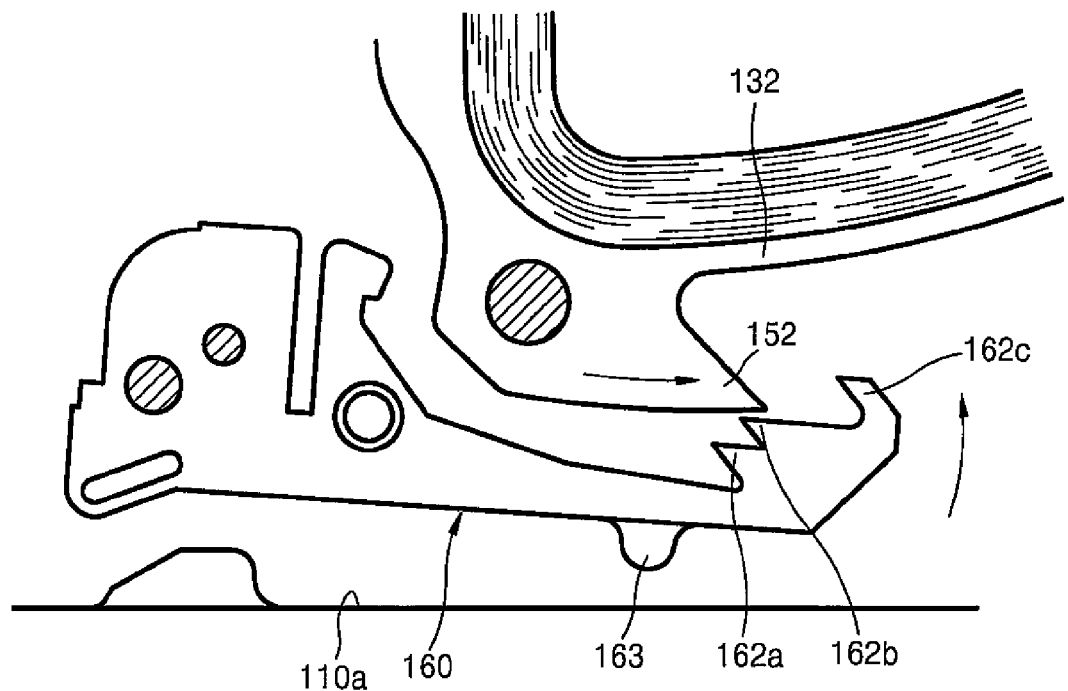

Referring to FIG. 8B, the swing arm 132 rotating in the clockwise direction collides with the buffering arm 171 of the latch lever 160, and the latch bumper 163 of the latch lever 160 rotating in the clockwise direction collides with the side wall 110a of the base 110. Accordingly, the swing arm 132 is secondarily rotated in the counter-clockwise direction and the latch lever 160 is rotated in the counter-clockwise direction as shown in FIG. 8C.

Figure 8D:
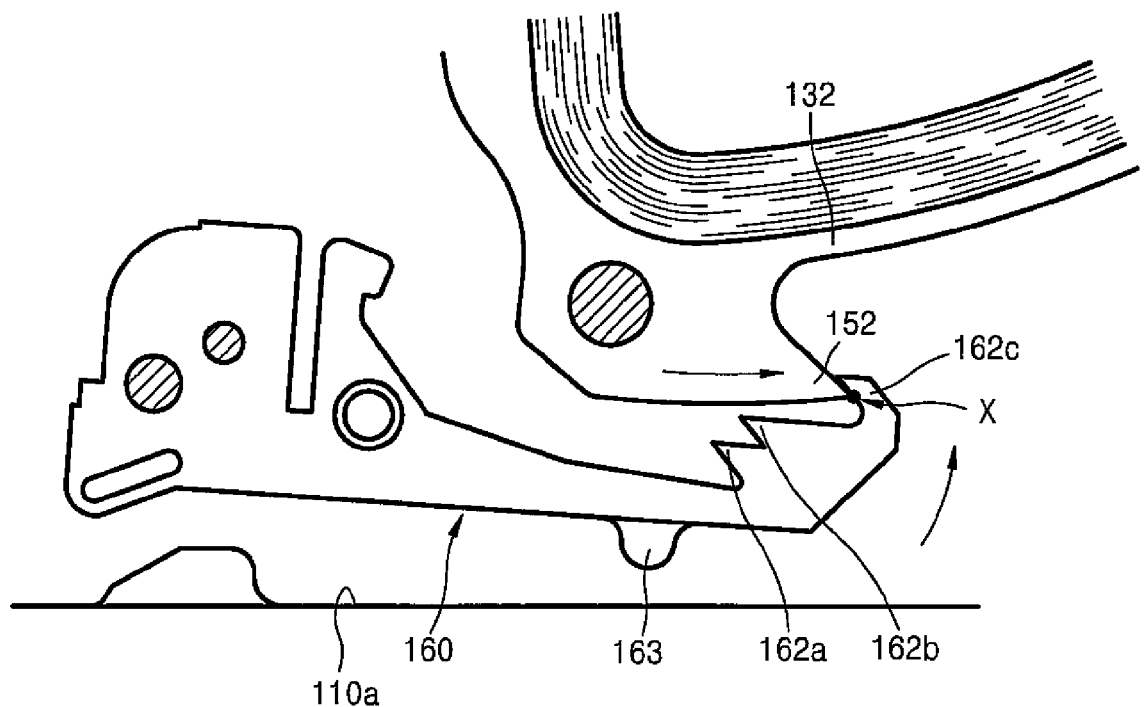

Referring to FIG. 8D, the rebound hook 162c of the latch lever 160 reaches point X earlier than the notch 152 of the swing arm 132. Therefore, the rebound hook 162c is received in the notch 152 to prevent the swing arm 132 from rotating any further in the counter-clockwise direction.

Figure 9:
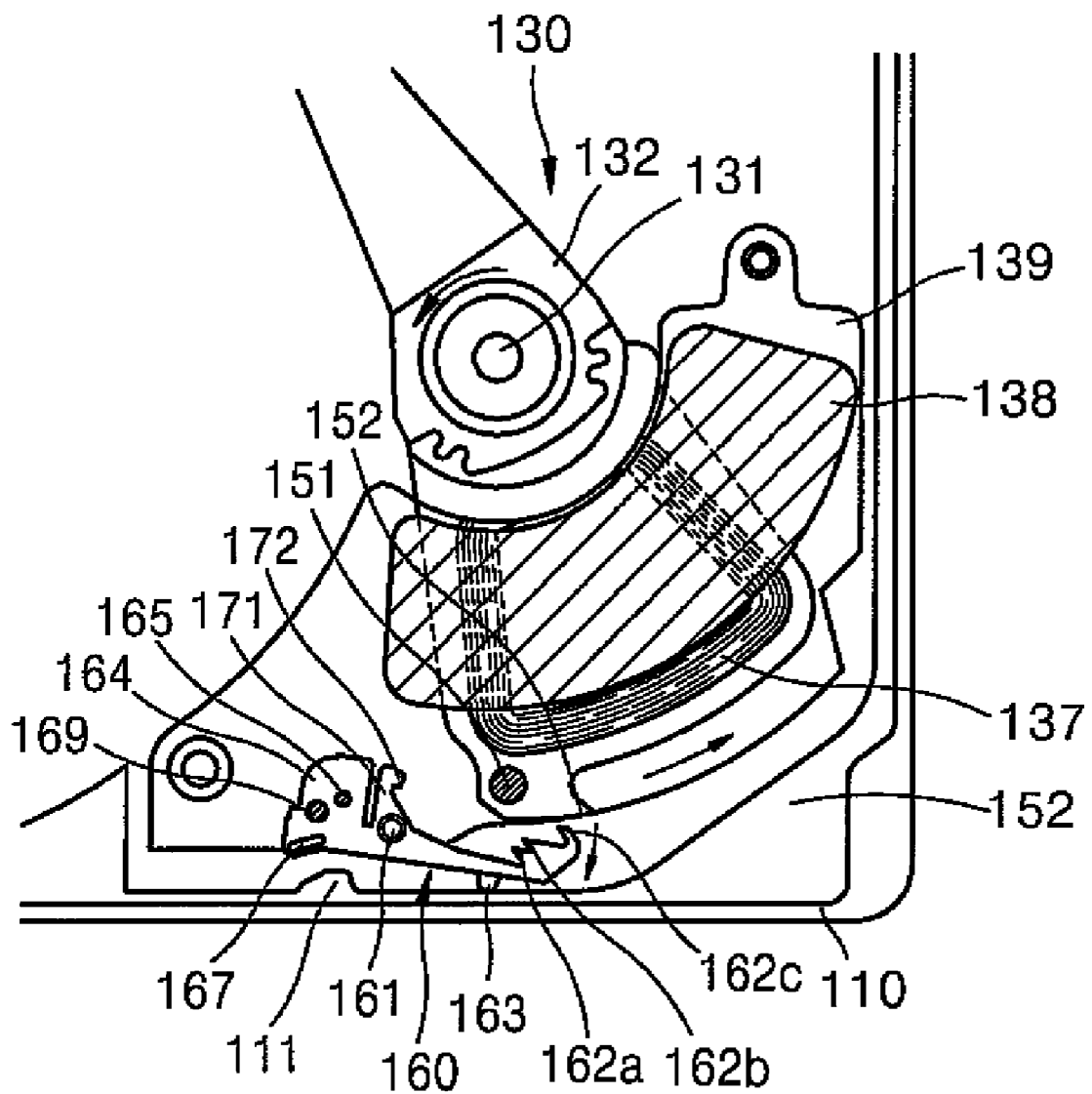
FIG. 9 is a plan view of the actuator latch system, similar to that of FIG. 7, but illustrates a releasing of the actuator by the latch system according to the present invention.

FIG. 9 illustrates how the actuator latch system according to the present invention releases the swing arm 132.

Current is supplied in one direction to the VCM coil 137 to operate the HDD 100. The interaction between the current and the magnetic field generated by the magnet(s) 138 creates an electromotive force on the swing arm 132 which is greater than the torque applied to the swing arm 132 due to the magnetic force of attraction between first core 151 and the magnet(s) 138. Thus, the swing arm 132 rotates clockwise. At the same time, the latch lever 160 is rotated clockwise by the torque created by the magnetic force of attraction between the second core 165 and the magnet 138. Thus, the swing arm 132 is not engaged by the main hooks 162a and 162b and the rebound hook 162c of the latch lever 160.

According to the actuator latch system of the present invention, at least one main hook and a rebound hook are formed on the latch lever. Thus, the actuator latch system operates reliably. More specifically, at least one main hook is located close to the notch of the swing arm. Thus, the main hook is received within the notch within a short period of time after the swing arm begins to rotate due to an external shock applied to the HDD while the magnetic head is parked. Accordingly, the resulting impulse is relatively weak. In addition, the rebound hook engages the swing arm when the swing arm rebounds after a strong shock is applied to the HDD while the magnetic head is parked. Thus, the swing arm is retained in a position at which the magnetic head remains off of the recording surface of the disk.

Finally, although the present invention has been described in connection with the preferred embodiments thereof, it is to be understood that the scope of the present invention is not so limited. On the contrary, various modifications of and changes to the preferred embodiments will be apparent to those of ordinary skill in the art. For example, although the embodiment of the latch system according to the present invention has been shown and described above as having two main hooks 162a and 162b, the latch system may have only the first main hook 162a. Thus, changes to and modifications of the preferred embodiments may fall within the true spirit and scope of the invention as defined by the appended claims.

What is claimed is:

1. In a hard disk drive (HDD) having a base, a swing arm supported on the base so as to be rotatable about an axis of rotation, and a magnetic head supported by the swing arm, an actuator latch system comprising:
    an integral part of the swing arm that delimits a notch at a rear end portion of the swing arm, the integral part having a peripheral surface two portions of which meet at an inflection; and
    a latch lever disposed adjacent the rear end portion of the swing arm when the swing arm is in a position at which the magnetic head is parked, the latch lever being mounted to the base so as to be rotatable in opposite directions about an axis of rotation, and the latch lever having at least one main hook and a rebound hook at one end thereof, and a counterbalance at another end thereof,
    each of the hooks being offset in one direction of rotation of the swing arm when the swing arm is in a position at which the magnetic head is parked, and
    each of the hooks having a tip that lies between the axis of rotation of the swing arm and a line passing through said inflection in said one direction of rotation, while the swing arm is in a position at which the magnetic head is parked,
    the part of the swing arm delimiting the notch at the rear end thereof being disposed in between the hooks and the counterbalance, with respect to said directions of rotation, when the swing arm is in a position at which the magnetic head is parked such that the notch moves towards the hooks when the swing arm rotates from said position in said one direction of rotation and the rear end portion of the swing arm moves oppositely towards the counterbalance when the swing arm rotates from said position in the other direction of rotation,
    the counterbalance being disposed in the path of the swing arm when the swing arm rotates from said position in the other direction of rotation, and
    wherein the at least one main hook is positioned relative to said integral part of the swing arm such that one of the at least one main hooks engages the swing arm within the notch when the HDD experiences shock that causes the swing arm to initially rotate in said one direction about its axis of rotation while the magnetic head is parked, whereas the rebound hook is positioned relative to said integral part of the swing arm such that the rebound hook engages the swing arm within the notch when the HDD experiences shock that causes the swing arm to secondarily rotate in said one direction about its axis of rotation after rebounding from the counterbalance while the magnetic head is parked, to thereby keep the magnetic head parked.

2. The actuator latch system in an HDD as claimed in claim 1, wherein the rebound hook is offset with respect to each said at least one main hook in said one direction of rotation of the swing arm while the swing arm is in a position at which the magnetic head is parked.

3. The actuator latch system in an HDD as claimed in claim 1, wherein the rebound hook is disposed closer to the axis of rotation of the swing arm than each said at least one main hook while the swing arm is in a position at which the magnetic head is parked.

4. The actuator latch system in an HDD as claimed in claim 1, wherein the latch lever includes a latch bumper protruding towards a wall of the base, the wall being disposed within the path of the latch bumper when the latch lever rotates a given amount in one direction about its axis of rotation.

5. The actuator latch system in an HDD as claimed in claim 1, wherein the at least one main hook comprises first and second main hooks.

6. The actuator latch system in an HDD as claimed in claim 1, wherein the hooks of the latch lever and the counterbalance are disposed on opposite sides of the axis of rotation of the latch lever.

7. The actuator latch system in an HDD as claimed in claim 6, wherein the counterbalance has an elastic buffering arm that faces in a direction towards one side of the rear end portion of the swing arm.

8. The actuator latch system in an HDD as claimed in claim 6, further comprising a stopper positioned on the base within the path of the counterbalance when the latch lever is rotating in one direction about its axis of rotation.

9. The actuator latch system in an HDD as claimed in claim 6, further comprising a magnetic body integral with the counterbalance.

10. A hard disk drive (HDD) comprising:
    a base;
    a spindle motor mounted to the base;
    a disk mounted to the spindle motor so as to be rotated by the spindle motor;
    a swing arm supported on the base so as to be rotatable about an axis of rotation, and a magnetic head supported by the swing arm, the swing arm having a rear end portion whose peripheral surface defines a notch and has two portions meeting at an inflection at one side of the notch;
    a voice coil motor (VCM) that rotates the swing arm, the VCM including a voice coil disposed on the rear end portion of the swing arm, and at least one magnet supported on the base and facing the voice coil; and
    a latch lever disposed adjacent the rear end portion of the swing arm when the swing arm is in a position at which the magnetic head is parked, the latch lever being mounted to the base so as to be rotatable in opposite directions about an axis of rotation, and the latch lever having at least one main hook and a rebound hook at one end thereof, and a counterbalance at another end thereof,
    each of the hooks being offset in one direction of rotation of the swing arm when the swing arm is in a position at which the magnetic head is parked,
    each of the hooks having a tip that lies between the axis of rotation of the swing arm and a line passing through said inflection in said one direction of rotation, while the swing arm is in a position at which the magnetic head is parked, and
    the part of the swing arm delimiting the notch at the rear end thereof being disposed in between, with respect to said directions of rotation, the hooks and the counterbalance when the swing arm is in a position at which the magnetic head is parked such that the notch moves towards the hooks when the swing arm rotates from said position in said one direction of rotation and the rear end portion of the swing arm moves oppositely towards the counterbalance when the swing arm rotates from said position in the other direction of rotation, the counterbalance being disposed in the path of the swing arm when the swing arm rotates from said position in the other direction of rotation, and wherein the at least one main hook is positioned relative to said part of the swing arm such that one of the at least one main hooks engages the swing arm within the notch when the HDD experiences shock that causes the swing arm to initially rotate in said one direction about its axis of rotation while the magnetic head is parked, whereas the rebound hook is positioned relative to said part of the swing arm such that the rebound hook engages the swing arm within the notch when the HDD experiences shock that causes the swing arm to secondarily rotate in said one direction about its axis of rotation after rebounding from the counterbalance while the magnetic head is parked, to thereby keep the magnetic head parked.

11. The HDD as claimed in claim 10, wherein the rebound hook is offset with respect to each said at least one main hook in said one direction of rotation of the swing arm while the swing arm is in a position at which the magnetic head is parked.

12. The HDD as claimed in claim 10, wherein the rebound hook is disposed closer to the axis of rotation of the swing arm than each said at least one main hook while the swing arm is in a position at which the magnetic head is parked.

13. The HDD as claimed in claim 10, wherein the base has an upright wall, and the latch lever includes a latch bumper protruding towards the wall, the wall being disposed within the path of the latch bumper when the latch lever rotates a given amount in one direction about its axis of rotation.

14. The HDD as claimed in claim 10, wherein the at least one main hook of the latch clever comprises a first main hook and a second main hook.

15. The HDD as claimed in claim 10, wherein the hooks of the latch lever and the counterbalance are disposed on opposite sides of the axis of rotation of the latch lever.

16. The HDD as claimed in claim 10, wherein the counterbalance has an elastic buffering arm that faces in a direction towards one side of the rear end portion of the swing arm.

17. The HDD as claimed in claim 16, further comprising a stopper positioned on the base within the path of the counterbalance when the latch lever is rotating in one direction about its axis of rotation.

18. The HDD as claimed in claim 16, further comprising a magnetic body integral with the counterbalance.

19. The HDD as claimed in claim 10, further comprising a ramp disposed radially outwardly of the disk and over which the swing arm is moved by the voice coil motor to park the magnetic head when the HDD is not being used.

* * * * *